April 16, 1968  C. S. KASPER ET AL  3,377,691
DEVICE FOR ASSEMBLING VALVE PARTS
Filed Oct. 7, 1965  5 Sheets-Sheet 4
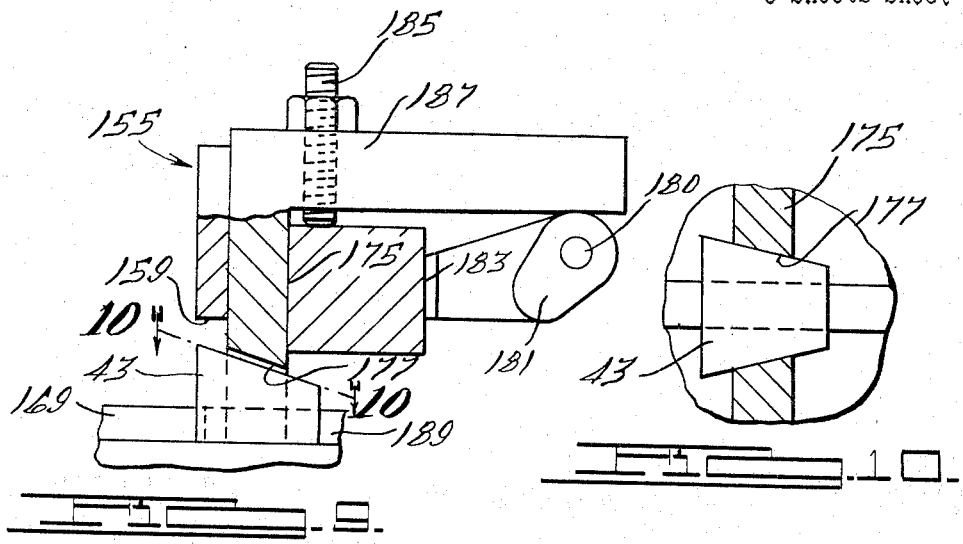
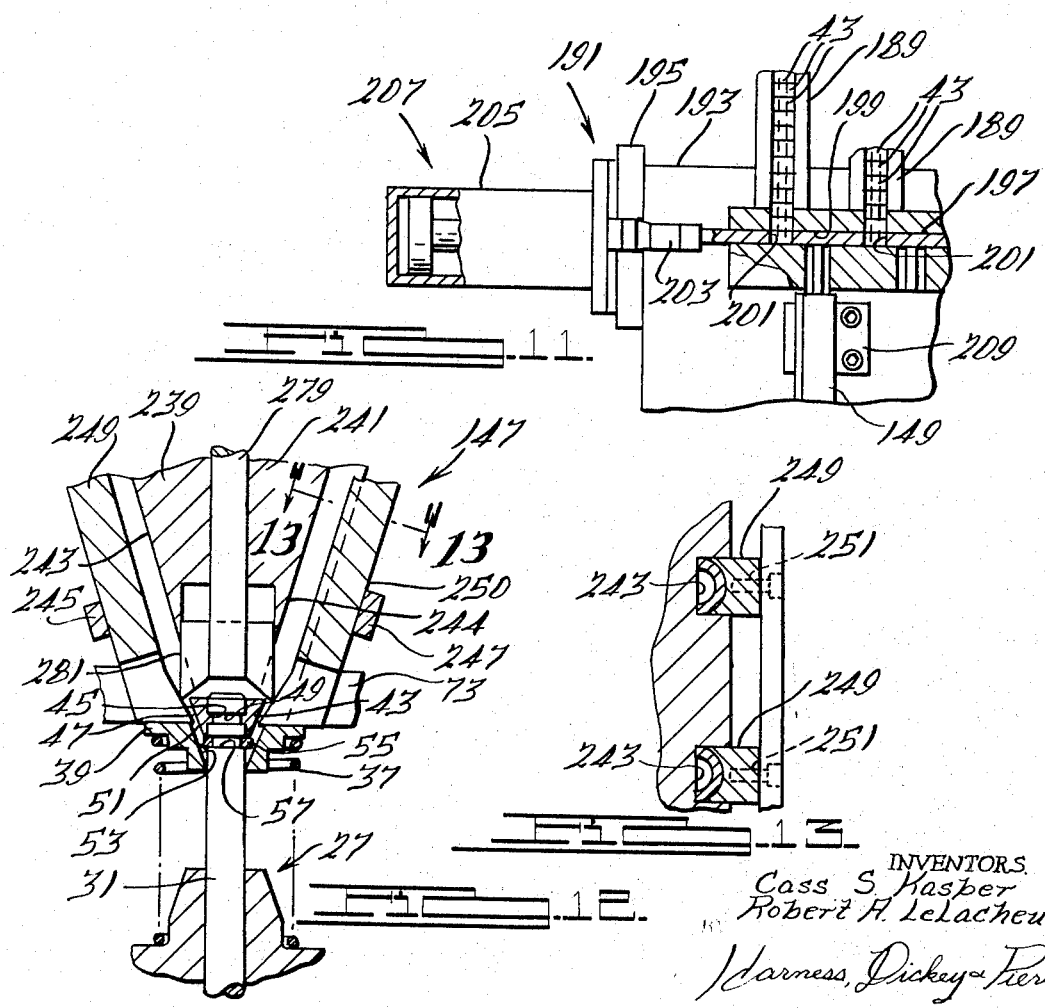
INVENTORS.
Cass S. Kasper
Robert H. LeLacheur
Harness, Dickey & Pierce
ATTORNEYS.

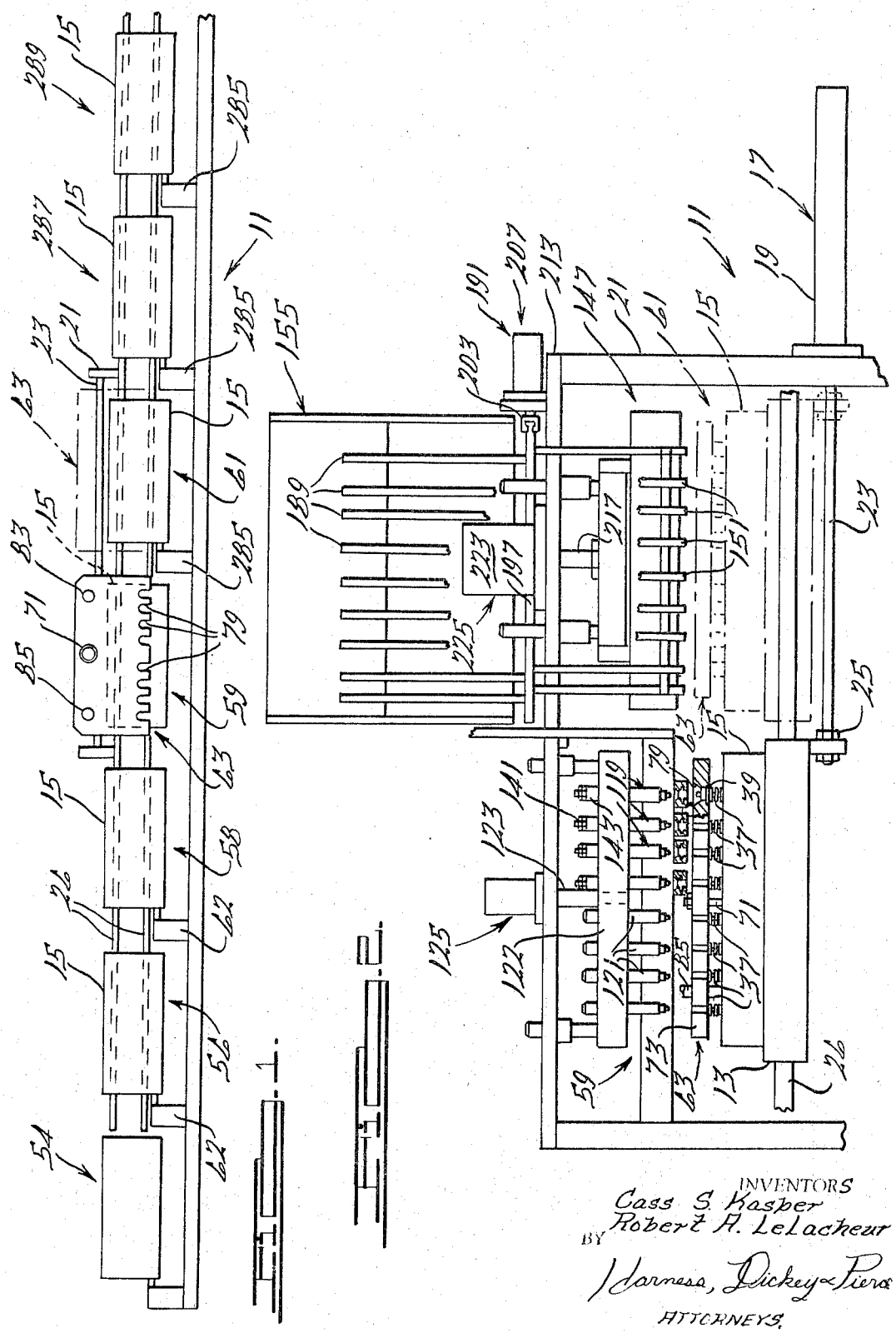

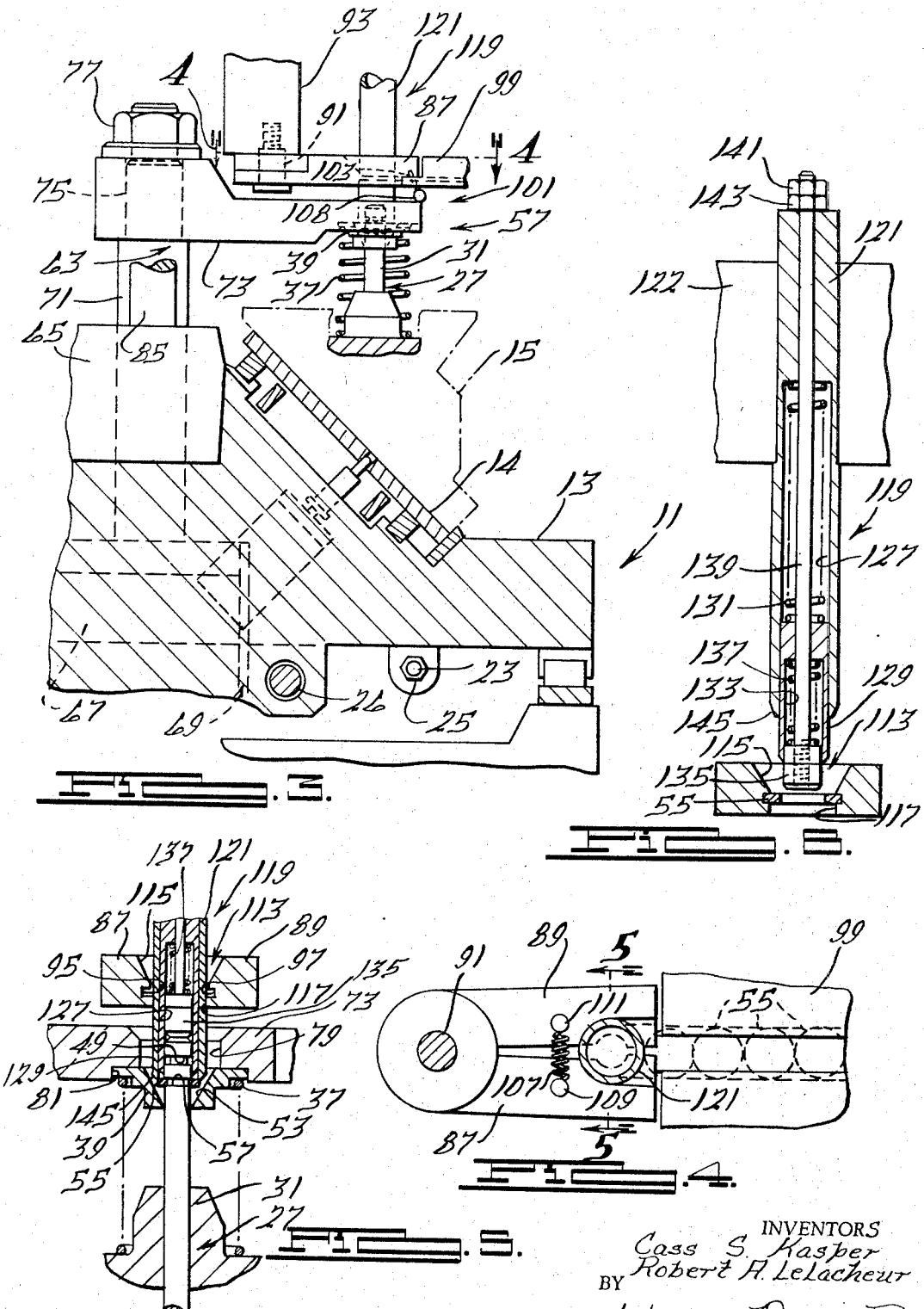

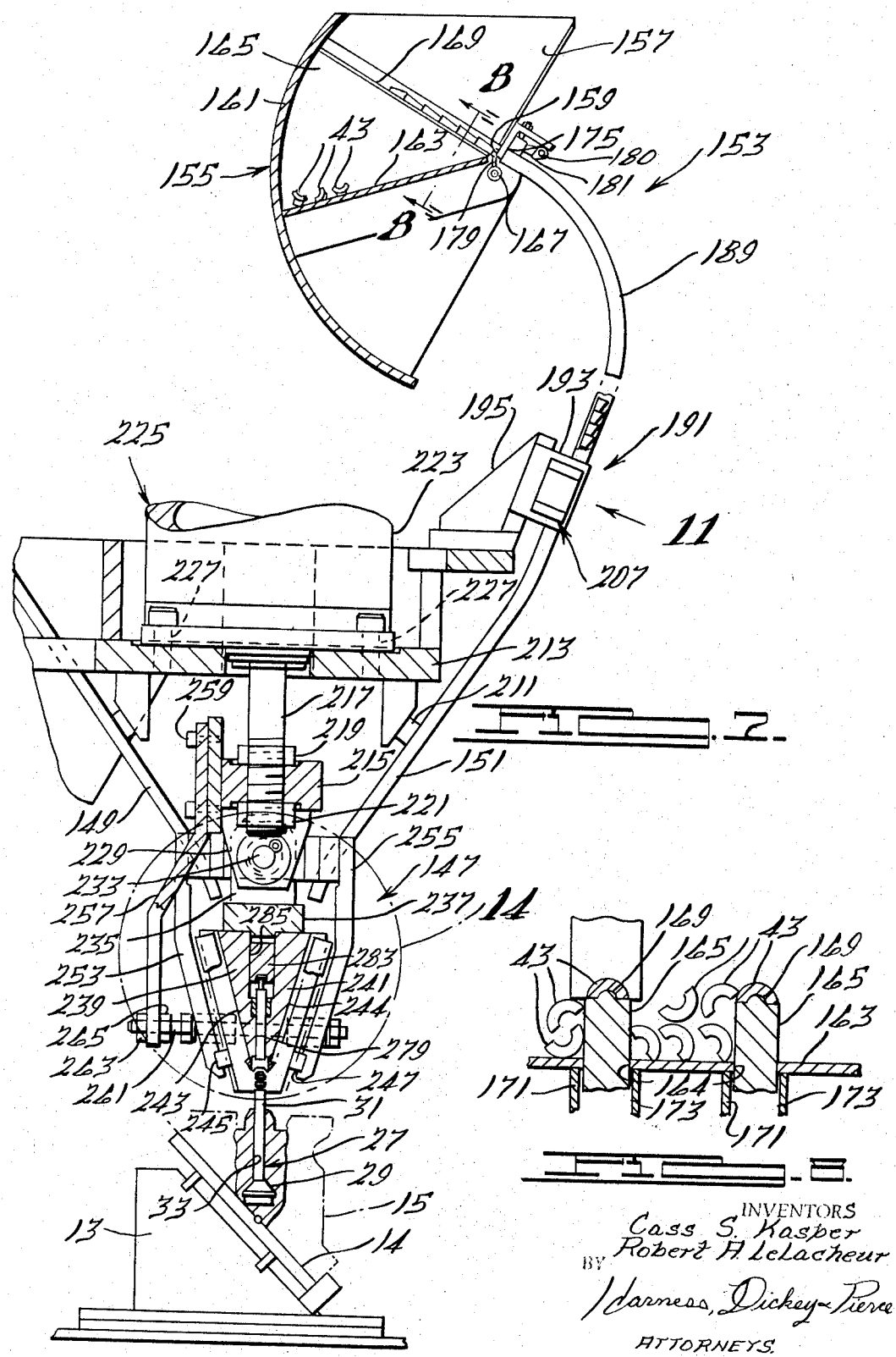

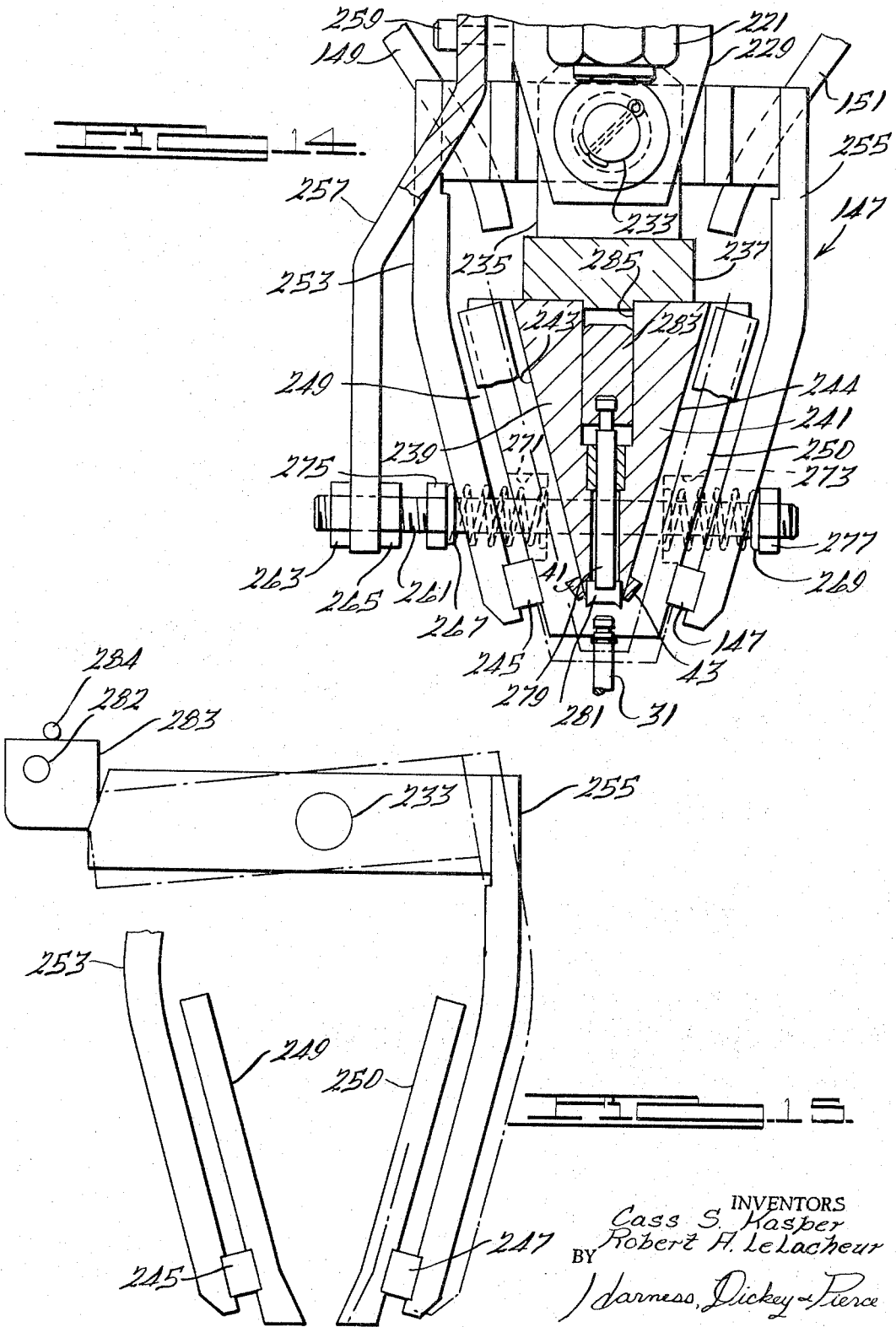

United States Patent Office 3,377,691
Patented Apr. 16, 1968

3,377,691
DEVICE FOR ASSEMBLING VALVE PARTS
Cass S. Kasper, Grosse Pointe, and Robert A. Le Lacheur, Utica, Mich., assignors to Inter-Lakes Engineering Company, Mount Clemens, Mich., a corporation of Michigan
Filed Oct. 7, 1965, Ser. No. 493,849
15 Claims. (Cl. 29—208)

ABSTRACT OF THE DISCLOSURE

Internal combustion engines with valve stems protruding therefrom move along an assembly line. Springs and spring retainers are placed on the stems, an O-ring seal is placed on each stem, and a set of locking keys are placed thereon, continuously and automatically.

---

This invention relates generally to assembling devices, and particularly to a device for automatically assembling O-rings and spring retainer lock keys on poppet valves of internal combustion engines.

In general, poppet-type engine valves are slidably mounted in the cylinder head of the internal combustion engine and are adapted to alternately open and close passages leading to and from the engine combustion chambers during operation. In one conventional form of engine, a compression spring is interposed between the cylinder head top and an annular retainer on each of the valve stems normally biasing the valves toward a closed position, or one where the valve head seats around and seals an opening adjacent thereto and leading to the engine combustion chamber. To open the valves, a cam actuated rocker arm assembly is provided to engage the base of each valve stem and move the valves in a direction compressing their springs unseating the valve heads from their openings.

To prevent excessive wear of the valve stems and rocker arms, the contact area therebetween is continuously lubricated during use and it is necessary that a seal be provided around the valve stem to prevent this oil from running down the valve stems where it can be drawn into the engine combustion chambers during high vacuum conditions. To achieve this, each valve stem is provided with an O-ring mounted in an annular groove therein and adapted to engage the annular spring retainer mounted on each stem.

In addition, each spring retainer must be held on its respective valve stem to cage the outer ends of the valve springs. Thus, a set of locking keys are assembled on the valve stem behind the spring retainer and these keys are held in place after assembly by engagement thereof by the spring retainer under the action of the springs.

Prior to the present invention, it was necessary to assemble the O-rings and the locking keys on the valve stems by hand largely because of difficulty in handling these parts and properly positioning them during assembly. Also, since the spring retainers hold the locking keys in the assembled position, it is necessary to hold the valve springs compressed during assembly. Furthermore, without the locking keys in position, the spring retainers can damage the assembled O-rings so that it is necessary to hold the valve springs compressed and the spring retainers spaced from the O-rings until the locking keys are fully assembled. Therefore, a device adapted to continuously and automatically assemble these O-rings and locking keys on the stems of poppet-type valves in internal combustion engine heads would be highly desirable.

Main objects of the present invention therefore are an automatic machine adapted to continuously and automatically handle and assemble and secure valve parts such as O-ring seals and spring retainer locking keys on the stems of poppet-type valves located in internal combustion engine heads.

Further objects include a device of the above character which is relatively inexpensive to manufacture, rugged in construction and efficient and reliable in use.

Other objects and advantages of the present invention will become more apparent from the following detailed description taken in conjunction with the drawings in which:

FIGURE 1 is a view illustrating diagrammatically a carriage and assembly device embodying the present invention and shown in the various operating stages and stations;

FIGURE 2 is an enlarged view, partly in section, of a portion of FIGURE 1;

FIGURE 3 is an enlarged sectional view illustrating the position of the parts during assembly of the O-rings;

FIGURE 4 is an enlarged sectional view of FIGURE 3 taken along the line 4—4 thereof;

FIGURE 5 is a sectional view of FIGURE 4 taken along the line 5—5 thereof;

FIGURE 6 is a sectional view illustrating the O-ring assembly parts before actuation thereof;

FIGURE 7 is an enlarged sectional view illustrating the retainer locking key assembly structure;

FIGURE 8 is an enlarged sectional view of FIGURE 7 taken along the line 8—8 thereof;

FIGURE 9 is an enlarged sectional view of the key hopper outlet opening structure of FIGURE 7;

FIGURE 10 is a sectional view of FIGURE 9 taken along the line 10—10 thereof;

FIGURE 11 is an enlarged view, partly in section, of a portion of FIGURE 7 looking in the direction of the arrow 11;

FIGURE 12 is an enlarged view of a portion of FIGURE 7 illustrating the key assembly structure and showing the keys in position on the valve stem.

FIGURE 13 is a sectional view of FIGURE 12 taken along the line 13—13 thereof;

FIGURE 14 is an enlarged view of a portion of FIGURE 7 taken within the enclosure 14; and FIGURE 15 is a diagrammatic view illustrating the "key clearing" structure for the key assembly device.

Broadly described, the present invention includes a carriage adapted to position an internal combustion engine head with the valves, springs and spring retainers thereon at O-ring and retainer locking key assembly stations, a clamp adapted to engage the spring retainers and hold the valve springs compressed and movable with said carriage, a mandrel for each engine valve at the O-ring assembly station adapted to singularly receive, expand and assemble O-rings into position on each of the valve stems, and a key handling device adapted to properly orient and deliver keys to a key assembly fixture which places the keys in assembled position on each valve stem.

Referring now more particularly to the drawings and specifically FIGURES 1-3, a transfer device generally indicated at 11 is seen provided with a carriage 13 having a tilted platen 14 adapted to hold and support an internal combustion engine head 15 thereon. A hydraulic motor 17 has a cylinder 19 secured to a stationary frame 21 and a piston rod 23 slidable within the cylinder 19. The outer end of the piston rod 23 is fixed to the carriage 13 by connecting means 25 so that by admitting fluid to the cylinder 19, the piston rod 23 and the carriage 13 are moved. A pair of fixedly mounted guide rails 26 slidably guides the carriage 13.

The cylinder head 15 is seen to have a plurality of poppet-type valves 27 mounted therein. In the conventional internal combustion engine, there are two such valves 27, namely, an intake and an exhaust valve, provided for each cylinder or combustion chamber so that for the conventional V-8 cylinder engine, which has two heads 15, there are sixteen such valves provided or eight for each head 15. For the six cylinder engine, there are twelve valves 27 and for the four cylinder engine, eight valves, and so on.

The valves 27 are, for the purposes of the present invention, substantially identical and each includes a head 29 and a depending stem 31 slidably disposed in corresponding openings 33 formed in the cylinder head 15 (see FIGURE 7). The valve head 29 is adapted to alternately open and close a passage (not shown) in the cylinder head 15 and connected to a corresponding engine combustion chamber (not shown). The valves 27 are normally biased each by a compression spring 37 toward a direction seating the valve head 29 upon an outer tapered surface of the opening 33 and are adapted to be moved in the opposite direction by a conventional rocker arm assembly (not shown) in the usual manner.

The valve springs 37 as shown surround a respective one of the valve stems 31 and have their lower end seated against an upper surface of the cylinder head 15. The upper end of each spring 37 engages a collar type retainer 39 which surrounds and is slidable relative to the valve stem 31. A pair of generally semi-circular locking keys 41, 43 are adapted to engage the valve stem 31 and the retainer 39 behind the same and hold the retainer 39 in place on the stem 31 (see FIGURE 12). Thus, the keys 41, 43 each have an inwardly extending semi-circular projection 45, 47 adapted to be received in a complementary annular groove 49 in the valve stem 31. The outer surface of the keys 41, 43 together form a downwardly facing frusto-conical surface 51 adapted to seat on a complementary upwardly facing conical surface 53 on the inner portion of the retainer 39 so that when the keys 41, 43 are in place on the valve stem 31, the springs 37 bias the retainer 39 upwardly and engagement between the surfaces 51, 53 holds the keys 41, 43 in place on the stem 31. An O-ring seal 55 is disposed in an annular groove 57 on the valve stem 31 below the groove 49 and engages the inner surface 53 of the retainer 39 to afford a seal as described above.

As set forth above, it has been the custom to assemble the O-rings 55 and the locking keys 41, 43 on the valve stems 31 by hand because of the difficulty of orienting and properly handling these relatively small keys and O-rings because of the danger of rupturing the O-rings during assembly. However, the present invention makes possible and, in fact, very practical automatic assembly of these parts.

Thus, as seen in FIGURE 1, the engine head 15 having the valves 27 and the springs 37 in place thereon is first delivered to a tilting station 54 where it is oriented to the position shown in FIGURE 3 so that the valve stems 31 extend vertically upwardly. A conventional pusher, shown diagrammatically at 62, engages and moves the head to station 56 where the retainers 56 are set on top of each spring 37 in surrounding relation to the valve stems 31. The pusher 62 then moves the head to an "idle" station 58, and thereafter to an O-ring assembly station 59 where the head 15 is positioned on the platen 14 of the carriage 13. The hydraulic motor 17 transfers the carriage from the station 59 to a locking key assembly station 61. Suitable means (not shown) may be provided to control the flow of fluid to the motor cylinder 19 from a fluid pressure source (not shown) to move the piston rod 23 and position the carriage 13 and engine head 15 properly at these stations 59, 61. However, control means of this type are well known in the art of fluid motor controls and are within the realm of the skilled engineer and since they form no part of the present invention are not illustrated nor described in detail here.

In their position on the carriage 13, it will be understood that the engine head 15 has the valves 27 in place in the head openings 33 and that the springs 37 are in position surrounding each of the stems 31 freely resting on the top of the head. A retainer 39 also is in place on the top of each spring 37, these springs being uncompressed and the retainers 39 each riding well up on its respective valve stem 31. To carry out the O-ring and locking key assembly steps, it is necessary that the springs 37 be compressed and the retainers 39 moved downwardly on the valve stems 31 to below the grooves 57 and 49 to expose these grooves for receiving the O-ring 55 and the locking keys 41, 43, respectively. In addition, since the O-rings 55 are assembled on the valve stems 31 first, and since the retainer 39 would rupture these O-rings 55 if allowed to move upwardly on the stems 31 under the force of the springs 37 before the locking keys 41, 43 are assembled, the retainers 39 must be held down and the springs 37 compressed until the keys 41, 43 are assembled on the stems 31.

To achieve this, the carriage 13 has a clamp device 63 mounted thereon for conjoint movement therewith. This clamp device 63 includes a base 65 secured to the carriage 13 and having a cylinder 67 of a fluid motor 69 also fixed to the carriage 13 (see FIGURE 3). A piston rod 71 is slidably disposed for movement relative to the cylinder 67 and has a clamp plate 73 secured thereto at an outer reduced threaded end 75 by a nut 77. The clamp plate 73 is formed with a plurality of slots 79 adjacent one edge thereof aligned with and adapted to freely receive the valve stems 31 (see FIGURE 5). As shown, the slots 79 are substantially larger than the valve stems 31 and the portion of the clamp plate 73 around these slots 79 is adapted to engage the retainers 39. The underside of the clamp plate 73 may be countersunk as at 81 adjacent each slot 79 to receive each of the retainers 39. Thus, when fluid is admitted to the cylinder 67 to move the piston rod 71 downwardly, the clamp plate 73 moves downwardly to its "clamping" position and engages the retainers 39 and moves them downwardly and the clamp plate 73 thus compresses the springs 37 as shown in FIGURES 3 and 5. This exposes the grooves 49, 57 on the valve stem 31 for assembly of the O-rings 55 and the keys 41, 43. If desired, the clamp plate 73 slidably receives a pair of guide bars 83, 85 secured to the base 65 to rigidify and accurately guide vertical movement of the clamp plate 73. The controls for delivery of fluid to the motor 69 from a source (not shown) have not been illustrated nor described in detail here since they are within the realm of the skilled engineer and do not form a part of the present invention. It will be understood, however, that the piston rod 71 and clamp plate 73 move downwardly to the "clamping" position, moving the retainers 39 downwardly and compressing the springs 37 when the engine head 15 is in place on the carriage 13 at the O-ring assembly station 59 and remain so until after the carriage and engine head move to the key assembly station 61.

The O-rings 55 are delivered individually to between a plurality of pairs of arms 87, 89, each pair being pivotally mounted on a pivot pin 91 secured to a fixed support 93, there being one pair of arms 87, 89 for each valve 27. Since these pairs of arms 87, 89 are identical, a description of one pair will suffice here.

Each of the arms 87, 89 has a slot 95, 97, respectively, in opposed relation and adapted to freely receive and support ones of the O-rings 55 delivered to between the arms 87, 89 by a feeder 99. This feeder 99 may simply be a track or conduit connected to a supply hopper (not shown), the track or conduit being vibrated by means (not shown) to feed the O-rings 55 progressively toward the arms 87, 89. To insure that only one of the O-rings 55 is delivered to between the arms 87, 89 for each O-ring loading step, an oscillating O-ring back-up device 101 is provided adjacent the outer ends of the arms 87, 89. This back-up 101 includes a pin 103 fixed to a rod or shaft 105 which oscillates back and forth. As the shaft 105 turns clockwise, as seen in FIGURE 3, the pin 103 swings upwardly and within an O-ring 55 located adjacent the ends of the arms 87, 89 and moves it and each succeeding O-ring 55 back along the conduit or track 99 and away from the arms 87, 89. The oscillating movement of the shaft 105 is timed with the known speed of movement of the O-rings 55 along the conduit 99. Manifestly, this movement is such as to permit a previously backed-up O-ring 55 to move past the pin 103 and to between the arms 87, 89 while the pin 103 engages and backs up the succeeding O-ring 55 as well as those behind it. Thus, along with allowing only one O-ring at a time to move between the arms 87, 89, the back-up 101 insures that succeeding O-rings 55 moving along the conduit 99 are in end-to-end butting relation for proper delivery to between the arms 87, 89.

As seen in FIGURE 4, the arms 87, 89 are resiliently biased toward each other by a tension spring 107 secured at its ends by pins 109, 111 to the arms 87, 89, respectively. An opening 113 having an upper generally frusto-conical portion 115 and a lower generally cylindrical portion 117 is formed in the arms 87, 89 adjacent the inner ends of the slots 95, 97. This opening 113 is aligned with a respective valve stem 31 and therefore an aperture 79 in the clamp plate 73 and each is adapted to receive a respective vertically movable mandrel device generally indicated at 119 which expands and assembles the O-rings 55 onto the valve stems 31. Here also, each of the mandrel devices 119 is identical and acts conjointly so that a description of one will suffice.

Each mandrel device 119 includes a rod 121 fixed adjacent its upper end through a plate 122 to a piston rod 123 of a fluid motor 125 and hollowed out at its lower end forming a cavity 127. An expanding block 129 is slidably disposed within the cavity 127 and is biased outwardly of the cavity 127 by a relatively strong compression spring 131 which engages the inner wall of the cavity 127 and the top of the expanding block 129. The lower end of the expanding block 129 is hollowed out, forming a cavity 133. A plug 135 is slidably disposed within the cavity 133 and is normally biased outwardly of the cavity 133 by a relatively weak compression spring 137 which engages the rear wall of the cavity 133 and the top of the plug 135. A rod 139 has its lower end threadedly received in the plug 135 and extends upwardly through the expanding block 129 and the rod 121. A pair of nuts 141, 143 are threaded on the upper end of the rod 139 and seat against the top of the rod 121 to hold the parts together.

In the normal position of parts, the rod 139 limits movement of the plug 135 outwardly of the cavity 133 and the opposing forces of the springs 131, 137 position the expanding block 129 relative to the cavity 127 in the rod 121. By controllably supplying fluid to the motor 125, the piston rod 123 moves downwardly and moves the mandrel devices 119 downwardly therewith. As described above, each mandrel device 119 is aligned with an opening 113 in a respective pair of arms 87, 89, which also is aligned with one opening 79 in the clamp plate 73 and one of the valve stems 31. Thus, during downward movement of the mandrel device 119, the plug 135 and expanding block 129 move through the O-ring 55 positioned in the slots 95, 97. The plug 135 is slightly smaller than the internal dimension of the O-ring 55 positioned in the slots 95, 97 and the expanding block 129 slightly larger than this dimension so that the O-ring is expanded and the arms 87, 89 are moved slightly apart during this phase of operation. Continued downward movement of the mandrel 119 brings the plug 135 into engagement with the top of the valve stem 31 whereupon only the expanding block 129 and the rod 121 continue moving downwardly with downward movement of the piston rod 123.

During this second phase of mandrel movement, the expanding block 129 and the rod 121 move relative to the plug 135 and the rod 139. Since the spring 137 is somewhat stronger than spring 131, the rod 121 begins moving to a greater extent than the expanding block 129 until at some point the force of the compressed spring 137 prevents further downward movement of the block 129 and only the rod 121 continues moving downwardly. Manifestly, this occurs when the expanding block 129 has moved past the top of the valve and covers the groove 49. At this point the spring 137 will have been compressed sufficiently to completely overcome the force of the spring 131 so that continued downward movement of the piston rod 123 moves the rod 121 relative to both the expanding block 129 and the plug 135 and compressing the spring 131. The lower end of the rod 121 has a downwardly facing frusto-conical surface 145 complementary to and adapted to engage the surface 115 on the arms 87, 89. Engagement between these surfaces and continued downward movement of the rod 121 wedges the arms 87, 89 apart, freeing the O-ring 55 from the slots 95, 97. Thereafter, the rod 121 engages the O-ring 55, which is expanded and positioned on the expanding block 129, and slides the O-ring off the expanding block and down along the valve stem 31. Movement of the piston rod 123 is such as to move the O-ring 55 into position in the annular groove 57 in the valve stem. Thereafter, the directional movement of the mandrel device 119 is reversed and a succeeding O-ring moved into position between the arms 87, 89 pursuant to the next O-ring assembly operation.

Retraction of the piston rod 127 triggers actuation of the motor 17 to move the carriage 13 to the key assembly station 61 where a set of keys 41, 43 are assembled into position in the groove 49 on each valve stem 31 above the O-ring 55. A vertically movable key assembling mechanism 147 is normally positioned above the carriage 13 and engine head 15 and is movable downwardly to assemble the keys 41, 43 in position on the valve stems 31. The mechanism 147 receives the keys 41, 43 from a plurality of pairs of lower conduits 149, 151 which are supplied from supply and metering devices 153. In practice, two such supply and metering devices 153 are provided, one for the conduits 149 and one for the conduits 151, there being one set of conduits 149, 151 for each valve 27. Only one device 153 is shown and it is to be understood that the other device 153 is identical in construction and reversed in orientation, and the operation thereof is identical in all respects to the one shown in the drawings and described below.

Thus, as shown in FIGURE 7, the supply and metering device 153 includes a hopper 155 secured to a fixed support 157. A plurality of keys (here designated 43 since the keys fed from this hopper 155 are those shown at 43 in the assembled valve) are loosely disposed in the hopper 155 and are adapted to be delivered to a plurality of hopper outlet openings 159 (one for each valve 27). The hopper 155 has a generally arcuate back wall 16 and a downwardly sloping floor 163. A plurality of feed blades 165 (one for each opening 159) are fixed to a shaft 167 pivotally supported within the hopper 155 adjacent the outlet openings 159. Each of the blades is of generally flat pie segment-like configuration having an outer arcuate end adapted to move closely along the hopper back wall 161. The hopper floor 163 is slotted at 164 to closely but freely receive each of the blades 165. A top radial edge 169 of each of the blades 165 is shaped complementary to the cross-sectional configuration of the keys 43 so that as the blades 165 swing upwardly past the floor 163, one or more of the keys 43 will be received in place on the edge 169 of each blade as is shown in FIGURE 8.

The blades 165 are movable through an arc from a position where their top radial edges 169 are below the floor 163 to a position where these edges form a downwardly sloping surface toward a respective one of the hopper outlet openings 159. A pair of side walls 171, 173 extend downwardly from the hopper floor 163 on either side of the slots 164 so that when the blade top radial edges 169 are below the floor 163, one of the keys 43 which might fall through the floor slots 164 will be moved up with the blades 165 and will not jam the device.

When the blades 165 reach their upper pivoted position, as shown in FIGURE 8, one or more of the keys 43 will be in seated position on each blade top edges 167 and will tend to slide toward respective hopper outlet openings 159. A gate 175 is positioned on the hopper 155 adjacent each outlet opening 159 and has a generally frusto-conical passage 177 formed therethrough. The keys 43 are also frusto-conical in cross-section so that if the smaller dimensioned end of the first of the keys 43 on the blades 165 to reach the respective hopper outlet opening 159 is pointed toward this outlet opening, these keys move part way through the gate opening 177 as shown in FIGURE 9. On the other hand, if the larger dimensional end of the first key 43 on each blade 165 reaches its respective hopper outlet opening 159 first, it will not move into the gate opening 177 but will simply rest against the inner surface of the gate 175. An intermittently operated air blast is directed upwardly against each of the first key 43 through passages 179 adjacent the hopper outlet opening 159. This air blast is synchronized with pivotal movement of the shaft 167 and blades 165 so as to occur after the first key 43 on each blade 165 is positioned at the outlet opening 159. Thus, if these keys 43 are properly oriented, i.e., with their smaller dimensional ends toward the hopper outlet opening 159, they will be positioned part way through the gate openings 177 and will not be blown away. If any of these keys 43 are reversely oriented with its larger end toward the respective outlet opening 159, the air blast will blow these keys away from the openings 159 and the gate 175 and these keys 43 will fall back to the floor 163 of the hopper 155.

The gates 175 are intermittently movable upwardly away from the hopper outlet openings 159 to permit passage therethrough of properly oriented keys 43, i.e., those which were positioned part way through the gate openings 177. Thus, a shaft 180 is provided with a cam 181 fixed thereto for rotation therewith. The cam 181 is positioned to engage an overhanging flange 187 of the gate 175 so that in one phase of rotation of the shaft 180, the cam 181 engages the flange 187 and raises the gate 175 allowing properly positioned keys 43 at the openings 177 to move therepast. The gate 175 is slidably mounted between the hopper 155 and a bar 183 fixed thereto and has an adjusting screw 185 engaging the top of the bar 183 to limit downward gate movement.

Immediately adjacent each hopper outlet opening 159 is an upper track 189 having its upper portion substantially on the same inclined slope as the blade edges 169 in their upper portion and extending slightly into the openings 159. Each track 189 is identical and is curved downwardly and inwardly to facilitate easy travel of the keys 43 therethrough under the influence of gravity. The tracks 189 have an internal cross-sectional configuration complementary to that of the keys 43 at their larger dimensional ends so as to retain these keys in the same orientation throughout travel in the tracks 189 as when delivered through the hopper outlet openings 159.

The bottom end of each upper track 189 is secured to and terminates at a key transfer device 191 where one key 43 at a time is transferred from each track 189 for delivery to the key assembly mechanism 147. The key transfer device 191 includes a generally rectangular base 193 suitably secured to a fixed support 195. A bar 197 is slidably disposed in a cavity 199 in the base 193 and is formed with a plurality of transverse passages 201 coextensive with and adapted to align with the terminal bottom end of a respective one of the upper tracks 189. The bar 197 is connected to one end of a piston rod 203 slidably disposed in a cylinder 205 of a hydraulic motor 207 also fixed to the support 195. When fluid is admitted to the cylinder 205 to extend the piston rod 203, the bar 197 moves along the cavity 199 from a position where each passage 201 is in alignment with a respective one of the upper tracks 189 to a position in alignment with the lower tracks 151. The bar passage 201 has a cross-sectional configuration which substantially duplicates that of each upper track 189 and is of a length equal to one of the keys 43. Thus, when the bar 197 moves from alignment of its passages 201 with the upper tracks 189 to alignment with the lower tracks 151, it transfers one key 43 delivered thereto from each upper track 189 to a respective lower track 151. The transferred keys 43 drop by gravity into the lower tracks 151 which also are shaped complementary to the key 43 at its larger dimensional end and substantially identical to the upper tracks 189, thereby maintaining the same orientation of the key 43 throughout handling thereof.

The lower tracks 151 as shown each has its upper ends secured to the transfer device base 193 by a bracket 209 and is supported at an intermediate portion by a bracket 211 fixed to a frame 213 secured to the support 195. The bottom end of each lower track 151 is positioned adjacent the key assembly mechanism 147 and is adapted to deliver the keys 43 thereto in a manner described below.

The key assembling mechanism 147 depends from a plate 215 fixed to one end of a piston rod 217 by a pair of nuts 219, 221 threaded thereon (FIG. 7). The piston rod 217 is slidably disposed in a cylinder 223 of a hydraulic motor 225 fixed to the frame 213 by screws 227. A pair of spaced bearing plates 229 depend downwardly from the plate 215 and support a cross pin 233. A supporting leg 235 is pivotally mounted on the cross pin 233 and has a lower transverse portion 237 from which a pair of elongated wedge shaped blocks 239, 241 depend. Each of the blocks 239, 241 has a plurality of spaced slots 243, 244 formed therein along its outer edge, respectively, each of the slots 244 adapted to communicate with a respective one of the tracks 151. A pair of arms 245, 247 are located adjacent the wedge shaped blocks 239, 241, respectively, and each of the arms has a plurality of generally downwardly extending guide bars 249, 250, respectively, fixed thereto by screws 251, each of the guide bars 249, 250 being received in a respective one of the slots 243, 244.

The guide bars 249, 250 each has a generally concave inner end as seen in FIGURE 13 and together with the slots 243, 244 form a passage adapted to receive the keys 41, 43 from the tracks 149, 151 and maintain orientation thereof. It will be understood, of course, that the keys 41 are delivered to the tracks 149 from the hopper of the other supply and metering device 153 (not shown) and at selected intervals by a transfer device (not shown), but identical in all respects to the one shown at 191. The arms 245, 247 are each fixed to a respective inverted generally L-shaped bracket 253, 255, each of which is carried at its upper end upon the cross pin 233. The key assembling mechanism 147 is resiliently maintained in a generally vertical position by an elongated arm 257 fixed by screws 259 at one end to the plate 215 and having an elongated bolt 261 at its other end which extends through the wedge shaped blocks 239, 241. The bolt 261 is fixed to the arm 257 by nuts 263, 265 and has a pair of compression springs 267, 269 received in slots 271, 273 in the wedge shaped blocks 239, 241 and held in position by nuts 275, 277, respectively (FIG. 14). The arm 257 normally maintains the mechanism 147 vertical but the mechanism can pivot slightly about the cross pin 233 to compensate for misalignment of the device 147 relative to the valves 27 in a manner to be described.

The motor 225 is adapted to have fluid admitted to its cylinder 223 from a source (not shown) to retract the piston rod 217 and therefrom raise the key assembling mechanism 147 so as to position the top of the slots 243, 244 adjacent to and in communication with the bottom of the lower tracks 149, 151 in timed relation to actuation of the motor 207 of each transfer device 201 to extend the piston rod 203 and the bar 197 and deliver the keys 41, 43 to the lower tracks. Control and timing means of this type are well known in the art and are not illustrated nor described in detail here. This causes one key 43 to be delivered through each of the lower tracks 151 to its respective slot 244 and one key 41 to be delivered to each of the lower tracks 149 to its respective slot 243 and ready to be assembled. The lower keys 41, 43 are held in the slots 243, 244 at their lower end by a plurality of pins 279 disposed between the wedge shaped blocks 239, 241 and each of which pins has an enlarged lower end 281 overlying the lower end of a respective set of the slots 243, 244. The upper ends of the pins 279 are each fixed to an elongated bar 283 vertically slidable in an opening 285 between the wedge shaped blocks 239, 241.

The bar 283 and the pins 279 normally are "down" under the force of gravity with the enlarged pin lower ends 281 blocking the slots 243, 244. After a set of keys 41, 43 have been positioned in each pair of slots 243, 244, the flow of fluid to the cylinder 223 is reversed and the key assembly fixture 147 moves down toward the engine head 15 and valves 27 in place on the carriage 13 therebeneath. The clamp plate 73 is still in its "clamping" position holding the springs 37 compressed and the retainers 39 down and each of the pin lower ends 281 is aligned with and engages the top of a respective valve stem 31. Continued downward movement of the mechanism 147 causes relative movement between the pins 279 and the other parts of the mechanism 147 until the bars 249, 250 seat on top of the retainers 39. The clamp plate slots 79 are understood to be large enough to receive the lower end of the bars 249, 250 as shown. Should any misalignment exist between the pins 279 and the valve stems 31, the springs 267, 269 flux and allow the mechanism 147 to move laterally. When the bars 249, 250 and the wedge-shaped blocks 239, 241 have moved sufficiently past the pin lower ends 281, the keys 41, 43 fall through the lower end of the slots 243, 244 and are directed into place on the valve stem 31. As shown, the lower ends of the bars 249, 250 are slotted and curved inwardly toward the valve stem 31. Also, the keys 41, 43 are each properly oriented throughout their handling so that when positioned on the valve stem 31, the ribs 45, 47 are accurately positioned in the valve stem groove 49. With the keys 41, 43 in position, the flow of fluid to the motor cylinder 223 and 67 is reversed and the mechanism 147 and clamp plate 73 begin moving upwardly. The curved lower ends of the bars 249, 250 insure proper seating of the keys 41, 43 on the valve stems 31 and as the bars 249, 250 and clamp plate 73 move upwardly, they allow the retainers 39 also to move upwardly under the force of the springs 37. The surface 53 of each retainer 39 engages the outer surfaces of the keys 41, 43 and holds them in place on the valve stems 31 and the assembly process is completed.

As the mechanism 147 continues moving upwardly, each of the brackets 253, 255 engages a cam 283 (only one of which is shown) pivotally mounted on the frame 213 by a pin 282 and resiliently held against a fixed stop 284. This causes the brackets 253, 255 each to swing outwardly about the cross pin 233 causing the bars 249, 250 to move out of the slots 243 and clear any extra or broken keys 41, 43 which might have inadvertently been delivered thereto. When the mechanism 147 reaches the top of its path, it is ready for the next key assembly cycle for a succeeding engine head 15 moved into position by the carriage 13 which begins with energization of the motors 207 to move the bars 197 and deliver the keys to the tracks 148, 149. Downward movement of the brackets 253, 255 past the cams 283 is permitted by means of the pivot mounting 282.

The key transfer device 191 delivers only one key 43 at a time to each of the lower tracks 151 as does a substantially key transfer device (not shown) deliver only one key 41 at a time to each of the other lower tracks 149. However, the hopper blades 165 operate continuously and deliver a supply of these keys to the upper tracks 189 where they build up at the transfer devices 191. Thus, an ample supply of properly oriented keys 41, 43 are always ready but only one set of these keys for each valve stem 31 is delivered at a time from the transfer devices 191 to the tracks 149, 151 and to the fixture 147.

Upon completion of the key assembling operation, a pusher 285, similar to the pusher 62, moves the head 15 to an "idle" station 287 and then to a station 289 where the parts are tested to insure that each set of keys 41, 43 is properly positioned on its valve stem 31 (FIG. 1). During this time, the carriage 13 moves back to receive a succeeding engine head 15 from the idle station 58 which begins the next assembly process.

Summarizing the operation of the assembly device, an engine head is positioned on the carriage 13 and the clamp 63 actuated to compress the valve springs 37 and expose the grooves 49, 57 of each valve. An O-ring 55 will have been positioned between each set of arms 87, 89 whereupon the mandrel device 119 moves downwardly expanding the O-rings 55 and placing one on each valve stem 31 within the grooves 57. The mandrel 119 is then retracted and the carriage 13 moved to the key assembly station 61. The blades 165 within the hoppers 155 operate continuously as does the gate 175 to build up an ample supply of keys 41, 43 within the upper tracks 189. The transfer devices 191, on the other hand, cycle once for each stroke of the mechanism 147 to deliver one key 41, 43 from each upper track 189 to a corresponding one of the lower tracks 149 and thence to the slots 243, 244 in the mechanism 147. The mechanism 147 then moves downwardly toward the valve stems 31 with one key in place at the lower end of each slot 243, 244. The pins 281 then engage the valve stems 31 whereupon the pins move upwardly and allow the keys 41, 43 to fall in place on the valve stems. Thereafter, both the mechanism 147 and the clamp 63 move upwardly and the carriage 13 moves back to the station 59 whereupon the device is ready for the next engine head 15.

By the above, there has been disclosed an automatic O-ring and retainer locking key assembly device calculated to fulfill the objects of the present invention and while a preferred form of this invention has been illustrated and described above in detail, various additions, substitutions, modifications and omissions may be made thereto without departing from the spirit of the invention as encompassed by the appended claims.

What is claimed is:

1. An automatic assembling and securing machine for assembling O-rings and spring retainer locking keys on the stems of poppet-type valves positioned in internal combustion engine heads and each valve having a compression return spring surrounding its stem and a retainer seated on the springs, said assembling device comprising, a movable carriage adapted to position said internal combustion engine head at an O-ring and a retainer locking key assembly station, clamp means adapted to move each said retainer to compress said springs and movable with said carriage, a mandrel device at the O-ring assembly station, said mandrel device including a plurality of rod means each engageable with a respective one of the valve stems, means moving said rod means conjointly toward and away from said valve stems, said rod means each including a first annular portion receiving and expanding an O-ring on the outer surface thereof and a second portion surrounding said first portion, said first and second portions being relatively movable, said first portion movable to a position surrounding a respective valve stem, said second portion engaging and removing said O-ring from said first portion and placing it on a respective valve stem, a key handling device at said key assembly station adapted to orient and deliver keys to a key assembling mechanism, said mechanism assembling a pair of keys on each valve stem behind the retainer.

2. An automatic assembling and securing machine for assembling O-rings and spring retainer locking keys on the stems of poppet-type valves positioned in internal combustion engine heads and each valve having a compression return spring surrounding its stem and a retainer seated on the springs, said assembling device comprising, a movable carriage adapted to position said internal combustion engine head at an O-ring and a retainer locking key assembly station, clamp means adapted to move each said retainer to compress said springs and movable with said carriage, a mandrel device at the O-ring assembly station, O-ring positioning means at said O-ring assembly station, said positioning means including a plurality of pairs of pivotally mounted arms, having a passage therethrough aligned with a respective one of the valve stems, resilient means biasing said arms of each said set toward each other, an O-ring positionable between each pair of arms at said passage, said mandrel device including a plurality of rod means each engageable with a respective one of the valve stems, means moving said rod means conjointly toward and away from said valve stems, said rod means each including a first portion movable through a respective one of said passages and receiving an O-ring and a second portion, said first and second portions being relatively movable, said second portion engaging a respective set of said arms and moving them apart and thereafter engaging and removing said O-ring from said first portion and placing it on a respective valve stem, a key handling device at said key assembly station adapted to orient and deliver keys to a key assembling mechanism, said mechanism assembling a pair of keys on each valve stem behind the retainer.

3. An automatic assembling and securing machine for assembling O-rings on the stems of poppet-type valves positioned in internal combustion engine heads and each valve having a compression return spring surrounding its stem and a retainer seated on the springs, said assembling device comprising, a movable carriage adapted to position said internal combustion engine head at an O-ring assembly station, clamp means adapted to move each said retainer to compress said springs and movable with said carriage, a mandrel device at the O-ring assembly station, said mandrel device including a plurality of rod means each engageable with a respective one of the valve stems, means moving said rod means conjointly toward and away from said valve stems, said rod means each including a first annular portion receiving and expanding an O-ring on the outer surface thereof and a second portion surrounding said first portion, said first and second portions being relatively movable, said first portion movable to a position surrounding a respective valve stem, said second portion engaging and removing said O-ring from said first portion and placing it on a respective valve stem.

4. An automatic assembling and securing machine for assembling spring retainer locking keys on the stems of poppet-type valves positioned in internal combustion engine heads and each valve having a compression spring surrounding its stem and a retainer seated on the springs, said assembling device comprising, a movable carriage adapted to position said internal combustion engine head at a retainer locking key assembly station, clamp means adapted to move each said retainer to compress said springs and movable with said carriage, said key handling device including hopper means having a pair of outlet openings for each said valve and delivering means cooperating with said outlet openings to deliver properly oriented keys from within said hopper through said outlet openings, a key assembling mechanism receiving said oriented keys from said hopper means and assembling a pair of keys on each valve stem behind said retainer.

5. An automatic assembling and securing machine for assembling spring retainer locking keys on the stems of poppet-type valves positioned in internal combusion engine heads and each valve having a compression spring surrounding its stem and a retainer seated on the springs, said assembling device comprising, a movable carriage adapted to position said internal combustion engine head at a retainer locking key assembly station, clamp means adapted to move each said retainer to compress said springs and movable with said carriage, said key handling device including at least one hopper having an outlet opening for each said valve, a plurality of blades in said hopper pivotally mounted adjacent said openings, each of said blades having an elongated edge generally complementary to the cross-sectional configuration of said keys and aligned with said openings, said blade edges engaging and supporting selected ones of said keys and conveying them toward said openings when in one pivoted position, a key assembling mechanism receiving said keys from said hopper openings and assembling a pair of keys on each valve stem behind said retainer.

6. An automatic assembling and securing machine for assembling spring retainer locking keys on the stems of poppet-type valves positioned in internal combustion engine heads and each valve having a compression spring surrounding its stem and a retainer seated on the springs, said assembling device comprising, a movable carriage adapted to position said internal combusion engine head at a retainer locking key assembly station, clamp means adapted to move each said retainer to compress said springs and movable with said carriage, said key handling device including at least one hopper having an outlet opening for each said valve, a plurality of blades in said hopper pivotally mounted adjacent said openings, each of said blades having an elongated edge generally complementary to the cross-sectional configuration of said keys and aligned with said openings, said blade edges engaging and supporting selected ones of said keys and conveying them toward said openings when in one pivoted position, gate means at said outlet openings allowing selected ones of said keys to pass through said openings, a key assembling mechanism receiving said keys from said hopper openings and assembling a pair of keys on each valve stem behind said retainer.

7. An automatic assembling and securing machine for assembling spring retainer locking keys on the stems of poppet-type valves positioned in internal combustion engine heads and each valve having a compression spring surrounding its stem and a retainer seated on the springs, said assembling device comprising, a movable carriage adapted to position said internal combustion engine head successively at an O-ring and a retainer locking key assembly station, clamp means adapted to move each said retainer to compress said springs and movable with said carriage, said key handling device including at least one hopper having an outlet opening for each said valve, a plurality of blades in said hopper pivotally mounted adjacent said openings, each of said blades having an elongated edge generally complementary to the cross-sectional configuration of said keys and aligned with said openings, said blade edges engaging and supporting selected ones of said keys and conveying them toward said openings when in one pivoted position, ejector means adjacent said outlet opening for removing other than said selected ones of said keys from said openings, a key assembling mechanism receiving said keys from said hopper openings and assembling a pair of keys on each valve stem behind said retainer.

8. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers, each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, a key assembling mechanism receiving said keys from said openings and assembling a pair of keys on each valve stem behind said retainer.

9. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers, each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, a gate positioned on each hopper adjacent the outlet openings thereof, each said gate having a plurality of apertures aligned with a respective one of said openings and being movable away from said openings in timed relation to movement of said blades to said one pivoted position to allow selected ones of said keys to pass through said outlet openings, said openings having a cross-sectional configuration generally complementary to the outer cross-sectional configuration of said keys, air blast ejector means adjacent each said outlet opening for removing other than said selected ones of said keys from said openings, a key assembling mechanism receiving said selected keys from said openings and assembling a pair of keys on each valve stem behind said retainer.

10. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers, each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembly fixture, said track means including a plurality of upper tracks adjacent said outlet openings and a plurality of lower tracks adjacent said fixture, transfer means between said upper and said lower tracks, delivering one key from each said upper track to a respective one of said lower tracks during each stroke of said fixture, said key assembling mechanism receiving said keys from said openings and assembling a pair of keys on each valve stem behind said retainer.

11. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembling mechanism, said track means including a plurality of upper tracks adjacent said outlet openings and a plurality of lower tracks adjacent said mechanism, transfer means between said upper and said lower tracks including a reciprocable bar having spaced apertures therethrough communicating with said upper tracks in one position and with said lower tracks in another position to deliver one key from each said upper track to a respective one of said lower tracks during each stroke of said mechanism, said key assembling mechanism receiving said keys from said openings and assembling a pair of keys on each valve stem behind said retainer.

12. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to more each retainer to compress said springs and movable with said carriage, a key handling device at said key assembly station, said key handling device including a pair of hoppers each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembling mechanism, said track means including a plurality of upper tracks adjacent said outlet openings and a plurality of lower tracks adjacent said fixture, transfer means between said upper and said lower tracks delivering one key from each said upper track to a respective one of said lower tracks during each stroke of said mechanism, said key assembling mechanism including a generally wedge-shaped member movable toward and away from said valves, a plurality of slots formed in the outer surface of each side of said member, one slot on each outer surface communicating with the stem of each said valve when said member is in one position and each slot communicating with a respective one of said lower tracks when said member is in another position, a plurality of bars carried by said mechanism and normally positioned adjacent to and closing the outer end of a respective one of said slots to form passages for said keys, whereby said member receives said selected keys from said lower tracks and assembles a pair of keys on each valve stem behind said retainer.

13. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembling mechanism, said track means including a plurality of upper tracks adjacent said outlet openings and a plurality of lower tracks adjacent said mechanism, transfer means between said upper and said lower tracks delivering one key from each said upper track to a respective one of said lower tracks during each stroke of said mechanism, said key assembling mechanism including a generally wedge-shaped member movable toward and away from said valves, a plurality of slots formed in the outer surface of each side of said member, one slot on each outer surface communicating with the stem of each said valve when said member is in one position and each slot communicating with a respective one of said lower tracks when said member is in another position, a plurality of bars carried by said mechanism and normally positioned adjacent to and closing the outer end of a respective one of said slots to form passages for said keys, cam means positioned to operatively engage said bars and move them outwardly of said slots when said member moves toward said another position, means movably carried by said fixture member normally blocking the exit end of each of said passages, said last-mentioned means movable away from said passages in response to movement of said fixture member adjacent said valve stems, whereby said member receives said selected keys from said lower tracks and assembles a pair of keys on each valve stem behind said retainer.

14. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage a key handling device at said key assembly station, said key handling device including a pair of hoppers each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembling mechanism, said track means including a plurality of upper tracks adjacent said outlet openings and a plurality of lower tracks adjacent said mechanism, transfer means between said upper and said lower tracks delivering one key from each said upper track to a respective one of said lower tracks during each stroke of said mechanism, said key assembling mechanism including a generally wedge-shaped member pivotally carried by a base and movable with said base toward and away from said valves, an arm fixed to said base, resilient means interconnecting said arm and said member permitting limited pivotal movement of said member in a plane normal to said first-mentioned direction of movement, a plurality of slots formed in the outer surface of each side of said member, one slot on each outer surface communicating with the stem of each said valve when said member is in one position and each slot communicating with a respective one of said lower tracks when said member is in another position, a plurality of bars carrried by said mechanism and normally positioned adjacent to and closing the outer end of a respective one of said slots to form passages for said keys, whereby said member receives said selected keys from said lower tracks and assembles a pair of keys on each valve stem behind said retainer.

15. An automatic assembling and securing machine for assembling spring retainer locking keys on the stems of poppet-type valves positioned in internal combustion engine heads and each valve having a compression spring surrounding its stem and a retainer seated on the springs, said assembly device comprising a movable carriage adapted to position said internal combustion engine head at a retainer locking key assembly station, clamp means adapted to move each said retainer to compress said springs and movable with said carriage, a key handling device at said key assembly station, said key handling device including a pair of hoppers each having a plurality of outlet openings, one for each said valve, delivery means including a plurality of blades in each said hopper pivotally mounted adjacent to and aligned with each said opening, respectively, each of said blades having an elongated edge generally complementary to the cross-sectional configuration of said keys, said blade edges engaging and supporting properly oriented ones of said keys and conveying them toward said openings when in one pivoted position, track means positioned adjacent each said outlet opening and adapted to convey said selected keys from said outlet openings to a key assembling mechanism, said track means including a plurality of upper tracks adjacent said outlet openings and a plurality of lower tracks adjacent said mechanism, transfer means between said upper and said lower tracks delivering one key from each said upper track to a respective one of said lower tracks during each stroke of said fixture, said key assembling mechanism including a generally wedge-shaped member movable toward and away from said valves, a plurality of slots formed in the outer surface of each side of said member, one slot on each outer surface communicating with the stem of each said valve when said member is in one position and each slot communicating with a respective one of said lower tracks when said member is in another position, a plurality of bars carried by said mechanism and normally positioned adjacent to and closing the outer end of a respective one of said slots to form passages for said keys, cam means positioned to operatively engage said bars and move them outwardly of said slots when said member moves toward said another position, whereby said member receives said selected keys from said lower tracks and assembles a pair of keys on each valve stem behind said retainer.

References Cited

UNITED STATES PATENTS

| | | |
|---|---|---|
| Re. 25,886 | 10/1965 | Cargill. |
| 1,437,983 | 12/1922 | Magna _____ 29—214 |
| 2,434,456 | 1/1948 | Cook _____ 29—215 |
| 2,814,858 | 12/1957 | Erdmann _____ 29—229 |
| 2,996,738 | 8/1961 | Wilson _____ 29—211 X |
| 3,025,594 | 3/1962 | Miller _____ 29—229 X |
| 3,107,898 | 10/1963 | Olson _____ 29—200 X |

THOMAS H. EAGER, *Primary Examiner.*